Oct. 18, 1927.
W. B. GRAY
WINDSHIELD WIPER
Filed Feb. 20, 1926
1,645,646
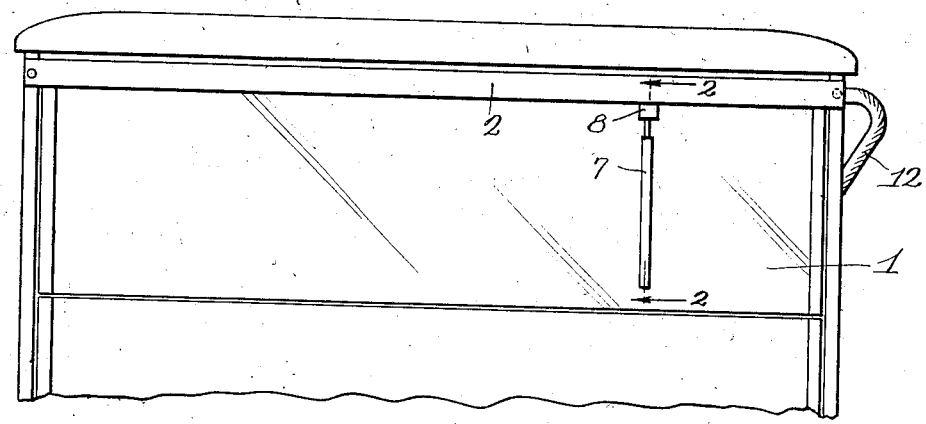
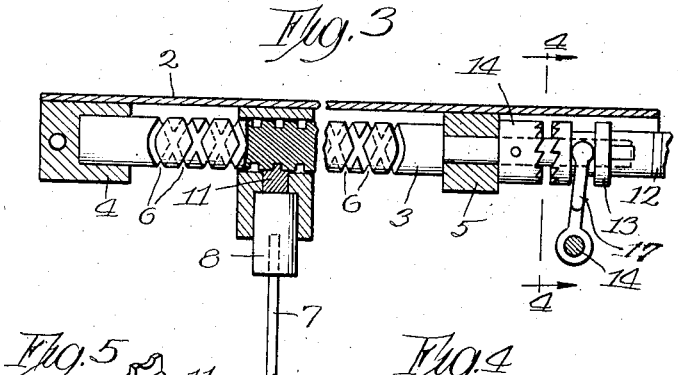
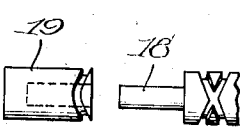
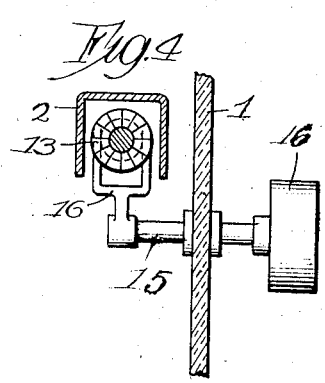
Inventor;
William B. Gray
By Arthur F. Durand Atty Patented Oct. 18, 1927.

1,645,646

UNITED STATES PATENT OFFICE.

WILLIAM B. GRAY, OF CHICAGO, ILLINOIS.

WINDSHIELD WIPER.

Application filed February 20, 1926. Serial No. 89,556.

This invention relates to wind shield wipers, or wipers for windows in general, more particularly to those which are power operated by electricity, or by other suitable power.

Generally stated, the object of the invention is to provide a novel and improved construction whereby the wiper will have movement bodily sidewise, back and forth across the surface of the wind shield or other glass to be kept clear, and whereby this back and forth movement of the wiper will be accomplished without reversal of the motor or power transmission means, and will be entirely automatic, as will hereinafter more fully appear.

It is also an object to provide certain details and features of construction and combinations tending to increase the general efficiency and the desirability of a wind shield wiper of this particular character.

To the foregoing and other useful ends, the invention consists of matters hereinafter set forth and claimed and shown in the accompanying drawings in which:

Fig. 1 is a front elevation of an automobile wind shield, showing the same equipped with a wiper embodying the principles of the invention.

Fig. 2 is an enlarged vertical section on line 2—2 in Fig. 1.

Fig. 3 is a detail vertical section on line 3—3 in Fig. 2, looking in the direction indicated by the arrows.

Fig. 4 is a vertical transverse section on line 4—4 in Fig. 3.

Fig. 5 is a detail perspective view of one of the parts.

Fig. 6 is a detail side elevation showing two parts to be connected together, and illustrating one of the details of the invention.

As thus illustrated, the automobile wind shield 1 is of glass or other transparent material, and may be mounted and supported in any suitable or desired manner. At the upper edge of the wind shield, supported in any suitable manner on the frame thereof, is an inverted channel-like sheet metal housing 2 having its slotted side facing downward. A shaft 3 is mounted in suitable bearings 4 and 5 within this housing, the shaft extending longitudinally of the housing immediately above the slot in the lower side of the housing. This shaft is provided with screw threads 6 extending in opposite directions, so that the shaft is screw-threaded in opposite directions as shown. The wiper 7 is supported at its upper end by a cylindrical portion 8, the latter in turn is supported in a traveler 9 that is shaped to travel back and forth in said housing and in said slot in the under side of said housing. A set screw 10 inserted through the lower portion of the traveler 9 holds the cylindrical portion 8 in place, and a separate engaging portion 11 is mounted in the traveler 9 and is free to turn about the vertical axis therein, the upper end of the element 11 being adapted to engage the screw threads 6 previously mentioned.

Therefore, rotation of the shaft 3 will cause the traveler 9 to travel along longitudinally of the housing 2, but when the upper end of the element 11 reaches the end of the thread which causes it to move toward one end of the shaft, this engaging portion will then enter the other or cross thread, the two threads being united or connected together at their ends at each end portion of the shaft, thus causing the traveler 9 to automatically travel back and forth on the shaft 3, but without reversing the rotation of said shaft. For the rotation of the shaft 3, any suitable or desired arrangement can be employed, but power is preferably employed for this purpose, such as an electric motor (not shown) of any suitable character and located in any suitable position. As shown, a flexible power driven shaft 12 is connected to the clutch member 13, the latter being adapted to engage the clutch collar 14 on the reduced end portion of the shaft 3 as shown in Fig. 3 of the drawings. The clutch member 13 is slidable axially, to open and close the clutch, and for this purpose a rock shaft 15 is preferably inserted through the wind shield 1, as shown in Fig. 4, and provided with a handle 16 for the operation thereof. The outer end of the rock shaft 15 is provided with an arm 17 to engage the clutch member 13, whereby the driver of the car may twist the knob 15 in either direction and thereby open or close the clutch.

Obviously, therefore, when it is desired to clean the front surface of the wind shield, the driver will simply turn the knob slightly in one direction to close the clutch, and thus causing the motor to operate the wiper 7 back and forth across the outer surface of the wind shield. It will be seen that in this way the wiper 7 moves bodily sidewise back and forth, in a straight line, without any tilting or swinging motion, and that for this reason and by making the wiper long enough, the entire front surface of the wind shield can be wiped and kept clean and free from rain or snow or moisture.

The wiper 7 can be removably attached to the part 8, by means of the set screw 17, as shown in Fig. 2, or in any suitable or desired manner.

As shown in Fig. 6, the end of the shaft 3 has a reduced end portion 18, and a sleeve 19 is placed thereon, this sleeve having the connected end portions of the two spiral grooves or threads of the shaft. In this way, and as a manufacturing proposition, the double threaded shaft stock can be made in long lengths, and can then be cut to the proper length for any particular wind shield and the ends can then be provided with reduced portions 18 to receive sleeves 19, thereby completing the ends of the shaft to provide the connecting portions of the spiral grooves or threads at opposite ends of the shaft. If this were not done, then each shaft, for any particular width of wind shield, would have to be made all in one piece, with the spiral grooves or threads cut entirely in the one piece of shaft and this might be somewhat expensive. Therefore, by double threading long lengths of rod, and by then cutting up these long lengths into portions of the right length for different wind shields, by then finishing up the ends of these short lengths by applying the separately formed sleeves 19 thereto, less expense may be involved, under some circumstances, in the manufacture of the invention. The housing 2 is set in position, and the traveler 9 is fitted therein as shown, so that the engaging portion of the wiper 7 will tightly and firmly engage the front surface of the wind shield, whereby the housing guides the wiper in its back and forth travel across the front of the wind shield. As shown, the housing 2 is made separately and fastened to the front of the wind shield, at the upper edge thereof, but it is obvious that the housing 2 or some equivalent thereof, may be incorporated or built directly into the structure of the wind shield, in the manufacture of wind shields of this kind, should that become necessary or desirable.

As shown and described, the shaft for engaging and actuating the wiper carrier is rotatable in one direction only, being provided with a right and left continuous spiral groove formed in the surface thereof, so that the continuous rotation of the shaft in one direction is translated into back and forth or reciprocal motion by the wiper. It is obvious, however, that the wiper carrier may be operated by a shaft having a spiral groove of any suitable character, and rotated in any suitable manner, without departing from the spirit of the invention.

With the construction shown and described, which is illustrative of one form of the invention, the wiper 7 and the traveler 9 and the shaft 3, together with the engaging portion 11, form a wiper mechanism operatively supported on the front of the wind shield. On the other hand, the shaft 12 and the electric motor or other means for operating it, together with the shaft 15 and the handle 16 and the parts 13, 14 and 17, form a power mechanism for operating the wiper mechanism, and the knob 16 is a handle for starting the operation of the wiper. So far as the specific construction of the wiping mechanism is concerned, the power mechanism may be of any suitable form, but preferably there is a shaft of some kind, extending longitudinally of the motor vehicle, through the wind shield, with a knob or handle on the inner end of the shaft, for use in starting the operation of the wiper.

In combination with the rotary screw member 3, and the traveling wiper thereon, and with the guide whereby the wiper has bodily movement back and forth across the wind shield, and with suitable power mechanism for operating said mechanism, it will be seen that the handle 15 is preferably inside of the wind shield, and is connected by a short rotary shaft with the power means, whereby this handle serves as a controller for use in starting the operation of the wiper.

Without disclaiming anything, and without prejudice to any novelty disclosed, what I claim as my invention is:

1. In a wind shield wiper, the combination of a guide extending transversely at the upper portion of the windshield, in front thereof; a controller handle inside the wind shield, adjacent one end portion of said guide, for use in starting the operation of the wiper, a traveler on said guide, movable back and forth longitudinally thereof, a wiper carried by said traveler to engage the front surface of the wind shield, thereby movable bodily back and forth across the front surface of the wind shield, and instrumentalities controllable by said controller handle and including means engaging and operative to cause said traveler to move back back and forth along said guide, thereby to operate the wiper, there being a controller shaft extending through the shield structure to connect said controller handle to said instrumentalities.

2. A structure as specified in claim 1, said instrumentalities comprising a clutch disposed outside the wind shield and inside said guide for controlling the transmission of power to said traveler, said shaft being below the guide and having means to open and close said clutch.

3. In a power operated wind shield wiper, the combination of a guide and housing extending transversely at the upper portion of the wind shield, in front thereof, a controller handle inside the wind shield, adjacent one end portion of said guide, for use in starting the operation of the wiper, a traveler slidably mounted in said guide, movable back and forth longitudinally thereof in said guide, rotary drive means within the housing and guide for reciprocating said traveler, a wiper carried by the lower end of said traveler to engage the front surface of the wind shield and being thereby movable bodily back and forth across the front surface of the wind shield, and power operated means governed by said controller handle and including means operative to cause said drive means to actuate said traveler to move back and forth along said guide, thereby to operate the wiper, there being a controller shaft extending through the shield structure and connecting said controller handle to said means.

Specification signed this 16th day of Feb., 1926.

WILLIAM B. GRAY.